(No Model.)
W. HAILES, Dec'd.
W. H. & F. A. HAILES, Executors.
CULINARY VESSEL.
No. 506,849. Patented Oct. 17, 1893.
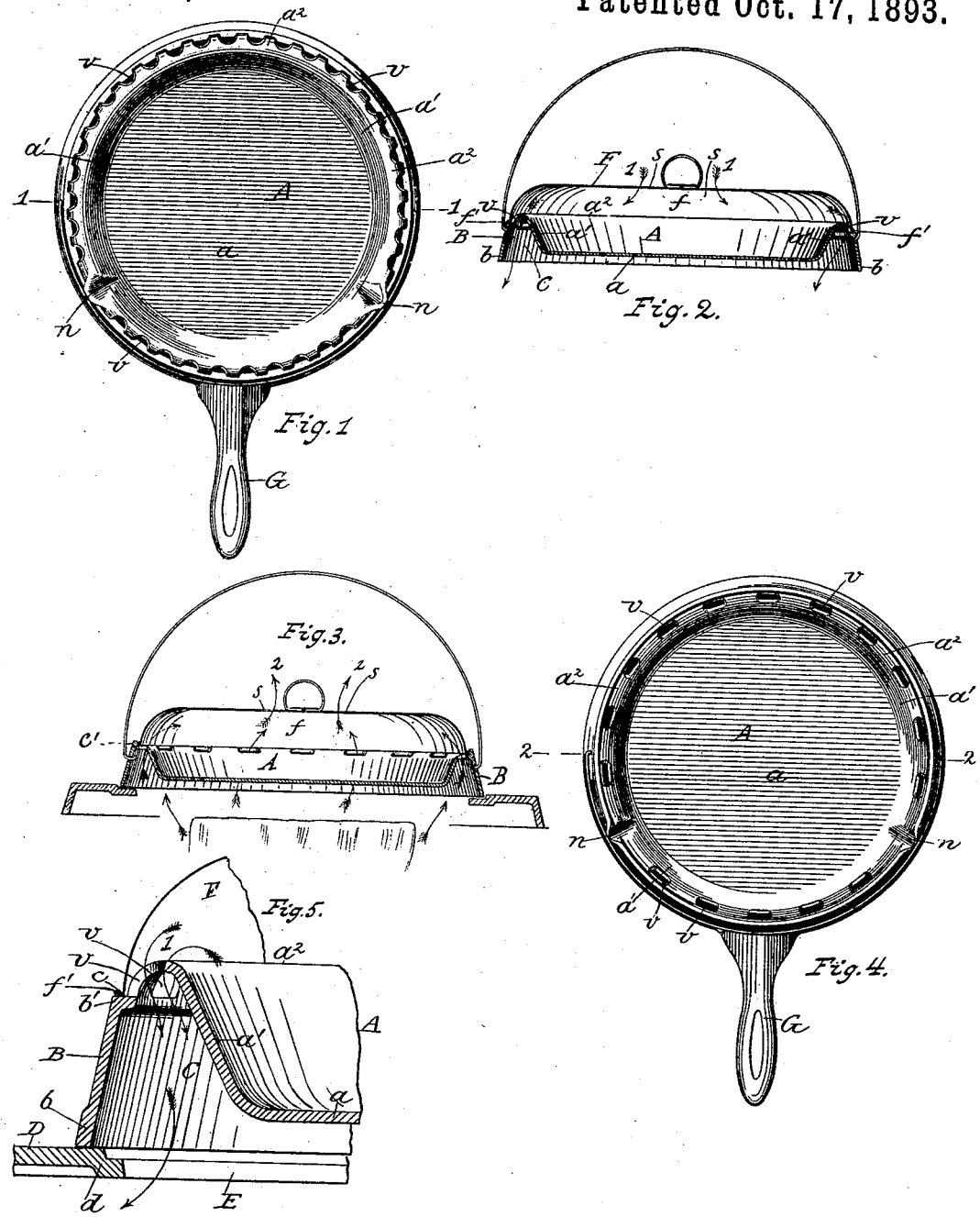

UNITED STATES PATENT OFFICE.

WILLIAM HAILES, OF ALBANY, NEW YORK; WILLIAM H. HAILES AND FREDERICK A. HAILES EXECUTORS OF SAID WILLIAM HAILES, DECEASED.

CULINARY VESSEL.

SPECIFICATION forming part of Letters Patent No. 506,849, dated October 17, 1893.

Application filed January 30, 1891. Serial No. 379,726. (No model.)

*To all whom it may concern:*

Be it known that I, WILLIAM HAILES, a citizen of the United States, residing at Albany, in the county of Albany and State of New York, have invented certain new and useful Improvements in Culinary Vessels, of which the following is a specification.

My invention relates to culinary vessels for use for cooking articles of food, and consists in the combinations, in culinary vessels, of the devices and elements hereinafter described and set forth in the claim, and the objects of my invention are, first, to provide means of which culinary vessels may be ventilated while in use cooking articles of food, so that the vapors, gases and odors developed within the vessel will have ready escape therefrom; and second, to provide means by which the improvements in this vessel may be embodied in, or combined with culinary vessels for accomplishing the objects above stated. I attain these objects by the means illustrated in the accompanying drawings, forming a part of this specification, in which—

Figure 1, is a plan view of a culinary vessel (a frying-pan) embodying the principle and essential features in this invention. Fig. 2 is a sectional elevation of the same, provided with a cover. Fig. 3 is a sectional elevation of a vessel with a modification of some of its parts, and illustrating its use and operation when used in connection with an oil or vapor burning stove. Fig. 4, is a plan view of the vessel shown in Fig. 3, with the cover removed. Fig. 5, is a sectional view on an enlarged scale and illustrating peculiar features in this invention and the manner in which the vapors move when the vessel is used with a stove connected with a chimney.

The same letters of reference refer to similar parts throughout the several views.

In the drawings A represents a culinary vessel which may be made of cast or sheet metal, as may be selected, and $a$ is the bottom thereof, and $a'$ its side walls, and $a^2$ its upper end margin, which is provided at intervals with perforations or openings $v\ v$.

B is the supporting skirt which is integral with vessel A as shown in Figs. 2, 3 and 5, and forms a single piece which may be readily produced by casting, as hollow-ware is produced. This supporting skirt is made, preferably, with a greater diameter of base portion than upper end portion, so as to flare outwardly all around as its walls run downwardly; and it is of larger diameter than the diameter of the vessel A, proper, so that there will be produced between the walls $a'$, of the vessel A, and the skirt wall the chamber C which will be concentric to the said vessel. This skirt is made to be relatively of greater depth or vertical extension than the side walls $a'$ of the vessel A as illustrated, and has its support from the stove top when used with an ordinary wood or coal stove; and by reason of this greater vertical extension of this skirt B over that of the said side walls $a'$ of the vessel, the said skirt will have a support, all around, from the top plate D, and at the margin edge $d$ of the usual pot-hole E in the said plate, and the bottom $a$ of the vessel A will be held on a plane above the plane of the lower edge $b$ of the skirt B and that of the upper surface of the top-plate D, with the said bottom $a$ exposed to the heat from the fire, when the pot hole cover is removed, as illustrated in Fig. 5. By this relative arrangement of the bottom $a$, of the vessel A, with that of the lower edge $b$ of the skirt B, the bottom of said vessel will be supported above the fire at such a distance that excessive heating of said bottom will be avoided, and at the same time the heat from the fire will be permitted to rise in the chamber C, all around, the side walls of the vessel A so as to heat the said side walls, and at the same time the skirt will prevent the cooler air outside the skirt, from lowering the temperature of the side walls $a$ of the vessel.

The perforations or openings $v\ v$ made in the upper end margin portion $a^2$ of the vessel A, are ventilating ports, or passage ways through which gases, or vapors may have passage in either direction accordingly as the said vessel and its concentric skirt is used with stoves and ranges burning wood or coal and connected with a chimney, or with a coal oil or vapor or gas stove.

F is a cover made of cast or sheet metal, and having in its lower side the chamber or cavity $f$. The lower margin edge $f'$ of this cover is made with a diameter greater than that of the perforated upper end margin $a^2$ of the vessel, so that it will have a seat on the upper end $b'$ of the skirt, as on the seating surface $c$, Figs. 2, and 5, or on seating surface $c'$, Fig. 3.

In Figs. 2 and 5, the upper margin portions $a^2$ of the vessel A, are shown to be curved outwardly and downwardly to a short distance with the ports $v\ v$ at intervals therein and wholly outside the chamber A' of said vessel; while in Figs. 3 and 4, this upper margin portion $a^2$ of the vessel is shown to be extended horizontally outwardly to a short distance with the ports $v\ v$ partly within the circle of the upper end of the vessel, but in all cases the cover has its lower edge margin $f'$ of such a larger diameter than that of the circle on which the said ports are made, that the said ports will be inclosed by the cover F, when it is in place as illustrated in Figs. 2, 3, and 5, that the said ports may be made to communicate from the chamber C between the skirt B and the vessel A to the chamber or cavity of the cover or the chamber of the vessel, and the reverse, accordingly as the draft may be upward or downward, through the annular chamber C between the vessel A and skirt B.

Although the cover F may in some cases, as when used with a stove or range having connection with a draft pipe or chimney, be imperforated in all its portions, yet for adapting this improved cooking vessel for all uses with wood or coal burning stoves or ranges, and with oil stoves, gas stoves, vapor or other classes of stoves or lamps or burners employed for cooking purposes, I provide neighboring the center of the cover, preferably, a series of small perforations $s\ s$, through which air may have passage from above into the chamber or cavity of the cover and thence through the ports $v\ v$ into the chamber C and thence into the fire as the air is drawn by the draft of the chimney, and as indicated by arrows 1, in Figs. 2 and 5; or through which the air and gases from an oil stove, or stoves or burners, burning vapors of gaseous oils or fluids, or gases for cooking purposes can have passage upwardly in direction of arrows 2, in Fig. 3, from the chamber C through the ports $v\ v$, into the chamber or cavity of the cover F to a discharge through the said series of perforations $s\ s$, in said cover to the air outside or to a suitable hood or draft pipe receiving such gases as may emanate from the burning oil, vapors, or gas, employed as fuel for cooking. This cover may be provided with any suitable device for a convenience for lifting and handling said cover.

One or more pouring channels $n$ are provided in the upper margin portion $a^2$ of the vessel for leading liquids within the said vessel to the outside without liability of flowing into the ports $v\ v$. The bottoms of these pouring channels are sunken in said upper margin portion $a^2$ of the vessel to such a distance as to freely receive and carry the liquids from the said vessel without liability of their entering the ports $v$, and when the said ports $v$ are arranged as shown in Figs. 3, and 4, these pouring channels will be sunk deeper than those used in vessels having the ports $v\ v$ as arranged in Figs. 1, 2 and 5. These pouring channels $n$ may be located at any point selected in the upper margin $a^2$ of the vessel.

G is a handle for lifting or handling the vessel, and is preferably of the kind known as bail handle, when the vessel and skirt are integral, and when made separate the vessel and skirt may each have the same kind of handle or one of them can be provided with a bail handle and the other with a horizontal or other form of lifting handle.

Although these improvements are shown to be embodied in vessels of circular form, yet they can be used in or with vessels of square or other shapes or forms, and can be applied to a great variety of culinary vessels or devices, such as frying pans, spiders, waffle-irons, griddles, stew-pans, pots, kettles, &c., with similar advantageous results.

When this improved vessel is supported by its skirt with its bottom $a$ over the open pot hole of a stove or range, which is connected with a chimney by a draft pipe, the draft of the stove will, through the ventilating ports $v\ v$, draw on the vapors and gases from the chamber of the vessel and cover, even when the latter is not provided with perforations $s\ s$ as the heat of the vessel, cooking the articles therein, will by its pressure operate to expel the vapors and gases, while they are drawn on by the draft of the stove flues through the ventilating ports $v\ v$. But when the cover is provided with perforations $s\ s$ or a register for opening and closing ports or holes in the cover, the draft of the stove or range will operate to draw air from the outside, into the cavity of the cover, to mingle with the vapors, gases and odors developed within the vessel while the cooking of the articles within is being done, and this air mingled with those vapors, gases and odors will be drawn by the draft into the fire box and thence into the flues of the stove or range to have exit into the chimney.

When this vessel with the skirt B is used with a stove or lamp or burner burning oil, gaseous fluids, or gases for fuel for cooking, and having no connection with a chimney, but having an upward passage of the products of combustion against the bottom of the vessel and into the chamber C, around it, the products of combustion will, after heating the bottom $a$ of the vessel and the side walls $a'$ of the same, have passage through the ports $v\ v$ into the chamber between the cover and walls of the vessel, and highly heat, so as to contribute to the cooking of the article, within, the articles of food from its top or upper side, and the vapors, gases and products of combustion from within will be permitted to escape through the perforations $s\ s$ or registers in the cover, and be received within any suitable hood or pipe which may be provided over the stove, lamp or burner, for leading the said vapors or gases to a suitable exit from the room.

Having described my invention, what I claim, and desire to secure by Letters Patent, is—

A culinary vessel A, made integral with the supporting skirt B, by portion $a^2$ joining the upper margins of said vessel and skirt, the said skirt being wholly extended downwardly, so that its lower edge margin $b$ projects below the line of the plain of said vessel and having with its upper end portion $b$ a cover receiving seat, and the vessel having one or more pouring spouts $n$ extended laterally from within its chamber to the line of the cover receiving seat, while portion $a^2$ integral with both said vessel and skirt is provided with perforations $v$ which communicate with chamber C between the walls of said vessel and the said skirt, the whole being provided with a suitable handle and combined with an arching form of cover F which has its margin edge seated on seat $b'$, all substantially as and for the purposes set forth.

WILLIAM HAILES.

Witnesses:
ALEX. SELKIRK,
FRED. A. HAILES.